F. G. TODT.
SAND DISCHARGING DEVICE.
APPLICATION FILED FEB. 2, 1920.

1,375,541.

Patented Apr. 19, 1921.
2 SHEETS—SHEET 1.

Witnesses
W. C. Fielding
Augustus B. Coppes

Inventor
Frederick G. Todt,
By Joshua R. H. Potts
His Attorney

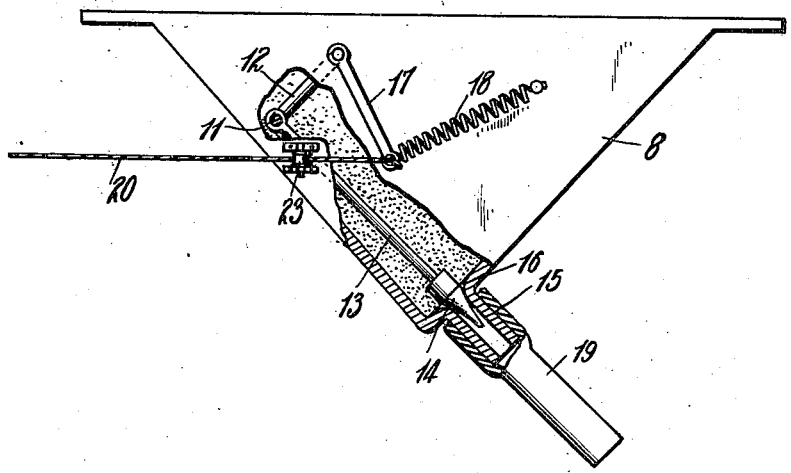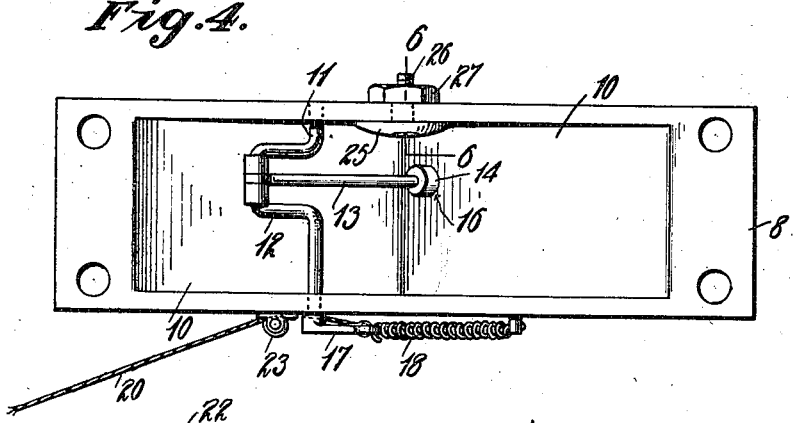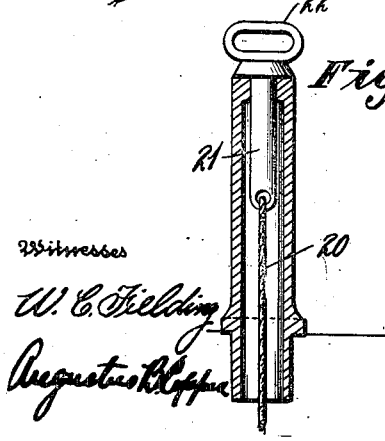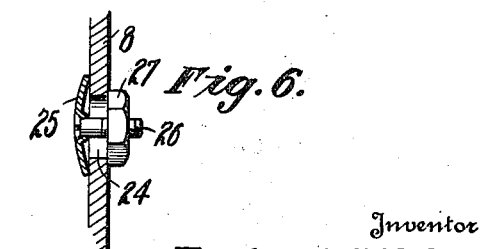

UNITED STATES PATENT OFFICE.

FREDERICK G. TODT, OF PHILADELPHIA, PENNSYLVANIA.

SAND-DISCHARGING DEVICE.

1,375,541.　　　　Specification of Letters Patent.　　Patented Apr. 19, 1921.

Application filed February 2, 1920. Serial No. 355,693.

*To all whom it may concern:*

Be it known that I, FREDERICK G. TODT, a citizen of the United States, residing at Philadelphia, in the county of Philadelphia and State of Pennsylvania, have invented certain new and useful Improvements in Sand - Discharging Devices, of which the following is a specification.

One object of my invention is to provide a device which can be practically used on a vehicle, such for example as an automobile, for discharging sand or other friction-producing material between the roadway and driving wheels so as to supply additional traction and prevent the driving wheels from slipping relatively to the roadway.

Another object is to provide improved means which will automatically cut off the discharge of the sand after some of the sand has been manually released.

A further object is to make my invention of a simple and durable construction and so that it can be easily and quickly attached to an automobile without being detrimental to or interfering with the other parts thereof.

These objects, and other advantageous ends which will be described hereinafter, I attain in the following manner, reference being had to the accompanying drawings in which—

Fig. 3 is an enlarged side elevation, partly in section, showing a portion of my invention, Fig. 4 is a top plan view of Fig. 3, Fig. 5 is a fragmentary sectional elevation showing a part of the sand-releasing means, and Fig. 6 is a fragmentary section taken on the line 6—6 of Fig. 4, showing a filling hole for the hopper; said hole being normally closed.

Figure 1:
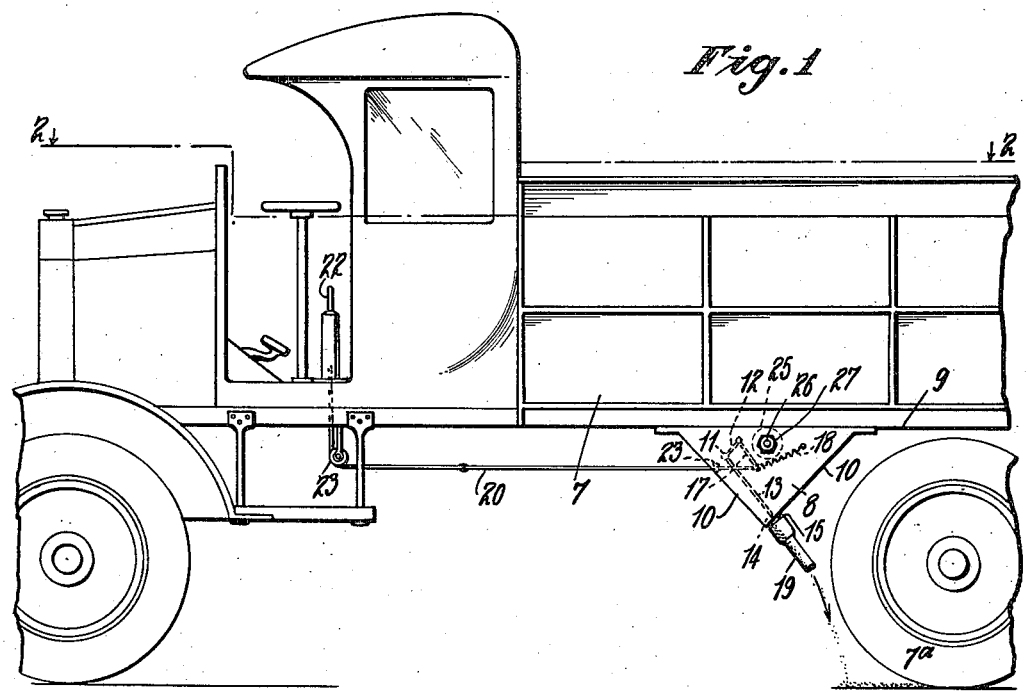
Figure 1 is a side elevation of a motor truck having my invention thereon.
Figure 2:
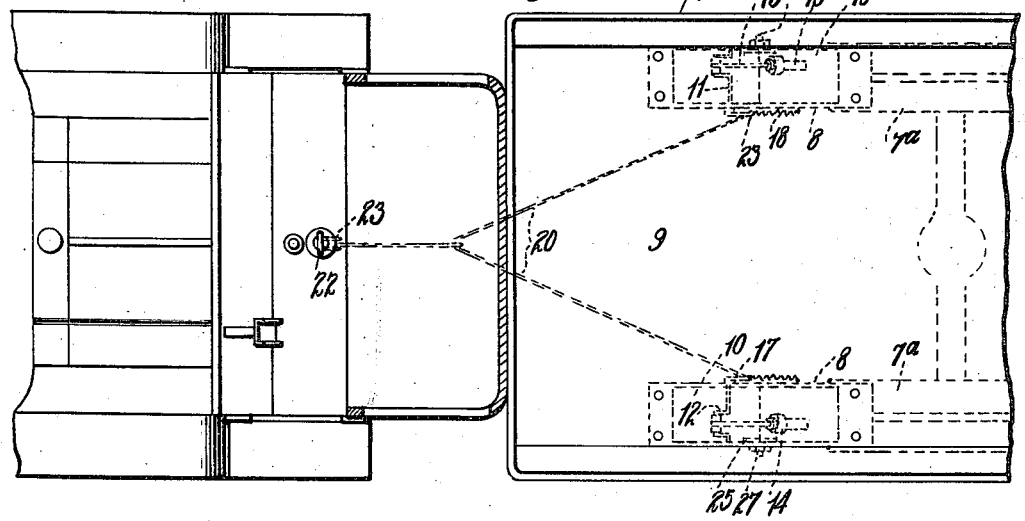
Fig. 2 is a sectional plan view taken on the line 2—2 of Fig. 1.

Referring to the drawings, 7 represents the body of a vehicle and 7ª represents the driving wheels. A hopper 8, which is open at its top as shown in Fig. 4, is secured by screws, bolts or other suitable means to the bottom 9 of the vehicle; said hopper tapering downwardly to provide slanting sides 10, as clearly shown in Figs. 1 and 3. As illustrated in Fig. 2, two of these hoppers 8 may be secured adjacent opposite sides of the vehicle and since each of these hoppers and associated parts are similarly constructed, I will describe but one in detail.

The hopper 8 has a crank shaft 11 mounted therein; said shaft being interrupted within its length to provide a crank 12 to which is pivotally connected a rod 13. The rod 13 extends downwardly through the hopper 8 and at its bottom has a tapered valve 14 which extends into a depending tube 15 which extends substantially in the direction of the length of the rod 13.

The inner surface of the hopper is curved or beveled at 16 in alinement with the interior of the tube 15 to form a seat for the larger portion of the valve 14. The crank shaft 11 is journaled in the sides of the hopper 8 and one end of said crank shaft projects out of the hopper and has an arm 17 secured thereto. A coiled spring 18 has one end attached to the arm 17 and its other end attached to the side of the hopper 8; said spring serving to move said arm and thereby turn the crank shaft to keep the valve 14 in engagement with the seat 16.

Sand or other friction-producing material is inserted within the hopper and a hose 19 or other suitable connection is attached to the tube 15 and extends substantially in the direction thereof toward the forward portion of the rear driving wheel 7ª so that when the valve 14 is raised the sand will pass through the tube 15 and hose 19 directly to that portion of the highway immediately in front of the rear driving wheel 7ª.

A cable 20 or other suitable flexible connection is attached to the arm 17 and to a stem 21 of a handle 22 which is preferably located adjacent the driver's seat. Antifriction rollers 23 are provided as bearings for the cable 20 and by pulling the handle 22 upwardly, the cable 20 will be pulled to swing the arm 17 and to stretch the spring 18. This swinging movement of the arm 18 causes the crank shaft 11 to be partially rotated and the crank 17 will serve to move the rod 13 upwardly and thereby lift the valve 14 from its seat 16, permitting sand to fall through the tube and hose as above described. Since the handle 22 is released, the spring 18 will act to swing the arm 17 backwardly and effect the closing of the valve 14.

The side of the hopper 8 is preferably provided with a hole 24, and a closure gate 25 is connected to a bolt 26 having a nut 27 thereon. By loosening the nut 27, the gate can be dropped sufficiently to permit the hopper to be filled with sand or similar material.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a hopper having a downwardly tapering bottom, one portion of which slants rearwardly, said hopper having an outlet tube extending in a direction substantially in alinement with said slanting portion of the bottom; a crank shaft rotatably mounted in opposite sides of the hopper and being interrupted in its length between said sides to provide a crank adapted to swing in close proximity to said slanting portion of the bottom of the hopper; a rod pivotally connected to said crank and extending substantially in the direction of said slanting portion of the hopper bottom, said rod having a tapered valve on its lower end adapted to move within said tube when the crank shaft is rocked; an arm connected to said crank shaft and located outside of said hopper; and means for oscillating said arm whereby the crank shaft will be rocked to withdraw the larger portion of the valve from the tube; substantially as described.

2. A device of the character described including a hopper having a downwardly tapering bottom, one portion of which slants rearwardly, said hopper having an outlet tube extending in a direction substantially in alinement with said slanting portion of the bottom; a crank shaft rotatably mounted in opposite sides of the hopper and being interrupted in its length between said sides to provide a crank adapted to swing in close proximity to said slanting portion of the bottom of the hopper; a rod pivotally connected to said crank and extending substantially in the direction of said slanting portion of the hopper bottom, said rod having a tapered valve on its lower end adapted to move within said tube when the crank shaft is rocked; an arm connected to said crank shaft and located outside of said hopper; means for oscillating said arm whereby the crank shaft will be rocked to withdraw the larger portion of the valve from the tube; and a spring connected to said arm and to the side of said hopper and adapted to move said arm in a direction opposite to that moved in by said means whereby said larger portion of the valve is moved into the tube to close the latter; substantially as described.

In testimony whereof I have signed my name to this specification in the presence of two subscribing witnesses.

FREDERICK G. TODT.

Witnesses:
CHAS. E. POTTS.
ANNA RENTORS.